US011570272B2

(12) United States Patent
Shimamura et al.

(10) Patent No.: US 11,570,272 B2
(45) Date of Patent: Jan. 31, 2023

(54) PROVISIONING USING PRE-FETCHED DATA IN SERVERLESS COMPUTING ENVIRONMENTS

(71) Applicant: Cisco Technology, Inc., San Jose, CA (US)

(72) Inventors: Komei Shimamura, London (GB); Amit Kumar Saha, Bangalore (IN); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/008,520

(22) Filed: Aug. 31, 2020

(65) Prior Publication Data

US 2020/0396311 A1    Dec. 17, 2020

Related U.S. Application Data

(63) Continuation of application No. 15/827,969, filed on Nov. 30, 2017, now Pat. No. 10,771,584.

(51) Int. Cl.
*G06F 15/16* (2006.01)
*H04L 67/5681* (2022.01)
(Continued)

(52) U.S. Cl.
CPC ........ *H04L 67/5681* (2022.05); *G06F 9/5027* (2013.01); *G06F 9/5072* (2013.01);
(Continued)

(58) Field of Classification Search
CPC .... G06F 9/5027; G06F 9/5033; G06F 9/5044; G06F 9/5072; G06F 9/5077; H04L 67/10; H04L 67/2847
See application file for complete search history.

(56) References Cited

U.S. PATENT DOCUMENTS 6,493,804 B1    12/2002  Soltis et al.
8,271,537 B2 *   9/2012  Schabenberger ....... G06F 16/27
                                                        707/802
(Continued)

FOREIGN PATENT DOCUMENTS

CN          102073546           7/2013
WO    WO-2012067890 A1 *   5/2012  ............ G06F 16/27
WO          2016166844         1/2018

OTHER PUBLICATIONS

Chen et al., Scheduling-Aware Data Prefetching for Data Processing Services in Cloud, 2017 IEEE 31st International Conference on Advanced Information Networking and Applications, Mar. 27, 2017, pp. 835-842. (Year: 2017).*
(Continued)

*Primary Examiner* — Ario Etienne
*Assistant Examiner* — Thorne E Waugh
(74) *Attorney, Agent, or Firm* — Polsinelli

(57) ABSTRACT

A method for data provisioning a serverless computing cluster. A plurality of user defined functions (UDFs) are received for execution on worker nodes of the serverless computing cluster. For a first UDF, one or more data locations of UDF data needed to execute the first UDF are determined. At a master node of the serverless computing cluster, a plurality of worker node tickets are received, each ticket indicating a resource availability of a corresponding worker node. The one or more data locations and the plurality of worker node tickets are analyzed to determine eligible worker nodes capable of executing the first UDF. The master node transmits a pre-fetch command to one or more of the eligible worker nodes, causing the eligible worker nodes to become a provisioned worker node for the first UDF by storing a pre-fetched first UDF data before the first UDF is assigned for execution.

20 Claims, 4 Drawing Sheets

US 11,570,272 B2
Page 2

(51) Int. Cl.
  G06F 9/50 (2006.01)
  H04L 67/10 (2022.01)
(52) U.S. Cl.
  CPC .......... *G06F 9/5077* (2013.01); *G06F 9/5033* (2013.01); *G06F 9/5044* (2013.01); *H04L 67/10* (2013.01)

(56) References Cited

U.S. PATENT DOCUMENTS

| | | | |
|---|---|---|---|
| 8,949,847 | B2 | 2/2015 | Kim et al. |
| 9,338,097 | B2 | 5/2016 | Anand et al. |
| 9,436,443 | B2 | 9/2016 | Chiosi et al. |
| 9,535,909 | B2 * | 1/2017 | Masse .................. G06Q 10/101 |
| 9,575,808 | B1 * | 2/2017 | Yamala ................. G06F 9/5044 |
| 9,613,068 | B2 * | 4/2017 | Tsirogiannis ........... G06F 16/86 |
| 9,665,405 | B1 * | 5/2017 | Goodnight .............. G06F 17/16 |
| 9,760,376 | B1 * | 9/2017 | Bequet .................. G06F 9/5027 |
| 9,900,378 | B2 * | 2/2018 | Zhang ................. G06F 9/30181 |
| 10,346,211 | B2 * | 7/2019 | Bequet .................. H04L 67/025 |
| 2011/0302583 | A1 * | 12/2011 | Abadi ................ G06F 16/2471 718/102 |
| 2012/0124100 | A1 * | 5/2012 | Schabenberger ....... G06F 16/27 718/1 |
| 2014/0053149 | A1 * | 2/2014 | Wu ........................... G06F 8/61 717/176 |
| 2015/0082308 | A1 | 3/2015 | Kiess et al. |
| 2016/0112502 | A1 | 4/2016 | Clarke et al. |
| 2016/0179560 | A1 | 6/2016 | Ganguli et al. |
| 2016/0212017 | A1 | 7/2016 | Li et al. |
| 2016/0226995 | A1 * | 8/2016 | Senarath ................. H04L 67/04 |
| 2016/0323377 | A1 * | 11/2016 | Einkauf ............. H04L 43/0876 |
| 2016/0328273 | A1 | 11/2016 | Molka et al. |
| 2018/0041600 | A1 | 2/2018 | Aikoh et al. |
| 2018/0109610 | A1 * | 4/2018 | Einkauf ................ G06F 9/5077 |
| 2019/0149480 | A1 * | 5/2019 | Singhvi .............. H04L 47/2483 709/226 |
| 2020/0328977 | A1 * | 10/2020 | Pfister ................. H04L 67/5681 |

OTHER PUBLICATIONS

"AWS Lambda Developer Guide," Amazon Web Services Inc., Hamtad, May 2017, 416 pages.
"AWS Serverless Multi-Tier Architectures," Amazon Web Services Inc., Nov. 2015, 20 pages.
"Cisco and Intel High-Performance VNFs on Cisco NFV Infrastructure," White Paper, © 2016 Cisco I Intel, Oct. 2016, 7 pages.
"Cisco NSH Service Chaining Configuration Guide," Cisco Systems, Inc., Jul. 28, 2017, 11 pages.
"Cloud Functions Overview," CloudFunctions Documentation, Mar. 21, 2017, 3 pages; https://cloud.google.com/functions/docs/concepts/overview.
"Cloud-Native VNF Modelling," Open Source Mano, © ETSI 2016, 18 pages.
"Network Functions Virtualisation (NFV); Use Cases," ETSI, GS NFV 001 v1.1.1, Architectural Framework, © European Telecommunications Standards Institute, Oct. 2013, 50 pages.
"Understanding Azure A Guide for Developers," Microsoft Corporation, Copyright © 2016 Microsoft Corporation, 39 pages.
"Xilinx Demonstrates Reconfigurable Acceleration for Cloud Scale Applications at SC16," PR Newswire, Nov. 7, 2016, 9 pages; http://news.sys-con.com/node/3948204.
Burt, Jeff, "Intel Begins Shipping Xeon Chips With FPGA Accelerators," eWeek, Apr. 13, 2016, 3 pages.
Capdevila, Pujol, P., "Deployment of NFV and SFC scenarios," EETAC, Master Thesis, Advisor: David Rincon Rivera, Feb. 17, 2017, 115 pages.
Chen, Yu-Ting, et al., "When Apache Spark Meets FPGAs: A Case Study for Next-Generation DNA Sequencing Acceleration," The 8th USENIX Workshop on Hot Topics in Cloud Computing, Jun. 20, 2016, 7 pages.
Ersue, Mehmet, "ETSI NFV Management and Orchestration—An Overview," Presentation at the IETF# 88 Meeting, Nov. 3, 2013, 14 pages.
Fahmy Suhaib A., et al., "Virtualized FPGA Accelerators for Efficient Cloud Computing," The University of Warwick, Cloud Computing Technology and Science (CloudCom), IEEE 7th International Conference, Nov. 30, 2015, 7 pages.
Hendrickson, Scott., et al. "Serverless Computation with OpenLambda." Elastic 60, University of Wisconson, Madison, Jun. 20, 2016, 7 pages.
Jain, Abhishek Kumar, "Architecture Centric Coarse-Grained FPGA Overlays," Nanyang Technological University, Jan. 2017, 195 pages.
Kachris, Christoforos, et al., "A Survey on Reconfigurable Accelerators for Cloud Computing," Conference Paper, Aug. 2016, 11 pages.
Kidane Hiliwi Leake, et al., "NoC Based Virtualized FPGA as Cloud Services," 3rd International Conference on Embedded Systems in Telecommunications and Instrumentation (ICESTI'16), Oct. 24, 2016, 6 pages.
Neshatpour, Katayoun, et al., "Energy-Efficient Acceleration of Big Data Analytics Applications Using FPGAs," IEEE International Conference, Oct. 29, 2015, 9 pages.
Orellana, Julio Proano, et al., "FPGA-Aware Scheduling Strategies at Hypervisor Level in Cloud Environments," Hindawi Publishing Corporation, Scientific Programming, vol. 2016, Article ID 4670271, May 22, 2016, 13 pages.
Pierre-Louis, Marc-Arthur, "OpenWhisk: A quick tech preview," DeveloperWorks Open, IBM, Feb. 22, 2016, 7 pages.
Putnam, Andrew, et al., "A Reconfigurable Fabric for Accelerating Large-Scale Datacenter Services," Computer Architecture (ISCA), 41st International Symposium, Jun. 2014, 12 pages.
Wikipedia contributors, "Serverless Computing," Wikipedia, The Free Encyclopedia, Jun. 11, 2017, 4 pages.
Yadav, Rishi, "What real cloud-native apps will look like," Crunch Network, Aug. 3, 2016, 8 pages.
International Search Report and Written Opinion from the International Searching Authority, dated Mar. 13, 2019, 17 pages, for corresponding International Patent Application No. PCT/US18/63455.
Chien-Hung, Chen, et al., "Scheduling-Aware Date Prefetching for Data Processing Services in Cloud," 2017 IEEE 31st International Conference on Advanced Information Networking and Applications (AINA), Mar. 1, 2017, pp. 835-842.
Westerbeek, Michiel, "Serverless Server-side Rendering with Redux-Saga," medium.com, Dec. 10, 2016, pp. 1-6.
Weissman et al., "Optimizing Remote File Access for Parallel and Distributed Network Applications," users@cs.umn.edu, Oct. 19, 2017, pp. 1-25.
Hejtmanek, "Scalable and Distributed Data Storage," is.muni.cz, Jan. 2005, pp. 1-58.

* cited by examiner

PROVISIONING USING PRE-FETCHED DATA IN SERVERLESS COMPUTING ENVIRONMENTS

CROSS-REFERENCE TO RELATED APPLICATION

This application is a continuation of U.S. patent application Ser. No. 15/827,969 filed on Nov. 30, 2017, the contents of which is incorporated by reference in its entirety.

TECHNICAL FIELD

The present technology relates in general to serverless computing environments, and more particularly to data provisioning and task provisioning in serverless computing environments.

BACKGROUND

The concept of serverless computing is fast gaining popularity in the field of cloud computing. The name serverless computing is somewhat of a misnomer, as servers are still required. Instead, the name originated due to the fact that server management and capacity planning decisions can be entirely hidden or otherwise abstracted from end users and consumers of compute power. Advantageously, end users can simply provide User Defined Functions (UDFs) or other compute jobs to a serverless computing environment, at which point the necessary computational resources are dynamically allocated to execute the UDFs or compute jobs—at no point in time is the user required to manage, or even be aware of, any underlying hardware or software resources.

In serverless computing environments, UDFs are often received from multiple end users. The order in which UDFs are executed can depend on numerous factors, ranging from aspects of the UDF itself (computational requirements, efficiency requirements, etc.) to service aspects offered by the operator of the serverless computing environment (maximum wait time guarantees, pay for priority, etc.). However the UDFs are ordered, they are typically held in one or more task queues prior to being executed. A main disadvantage of serverless computing lies in the manner in which tasks or UDFs are provisioned.

A UDF typically requires some amount of data in order to execute. For example, a UDF might require a dataset to analyze or operate upon, or a UDF might require several libraries in order to run to completion. In a serverless computing environment, it is very often the case that the UDF will not be scheduled for execution at the same node as which this requisite data resides. Instead, one or more nodes are selected to execute the UDF, and the requisite data must first be moved to these nodes before the UDF can begin to execute, thereby introducing what can be a significant amount of latency to the overall UDF computation process. Accordingly, improvements are needed.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The present technology includes methods and computer readable media for data provisioning a serverless computing environment (alternatively referred to as a serverless computing cluster) with pre-fetched data in order to reduce the execution latency of tasks and functions by the serverless computing environment. In some embodiments, this data provisioning is provided as a new step taking place before any existing steps of task allocation between UDFs and worker nodes of the serverless computing environment.

In accordance with the method, a plurality of user defined functions (UDFs) are received for execution on worker nodes of the serverless computing cluster. For a first UDF, one or more data locations of UDF data needed to execute the first UDF are determined. At a master node of the serverless computing cluster, a plurality of worker node tickets are received, each ticket indicating a resource availability of a corresponding worker node. The one or more data locations and the plurality of worker node tickets are analyzed to determine eligible worker nodes capable of executing the first UDF. The master node transmits a pre-fetch command to one or more of the eligible worker nodes, causing the eligible worker nodes to become a provisioned worker node for the first UDF by storing a pre-fetched first UDF data before the first UDF is assigned for execution.

DETAILED DESCRIPTION

Figure 1:
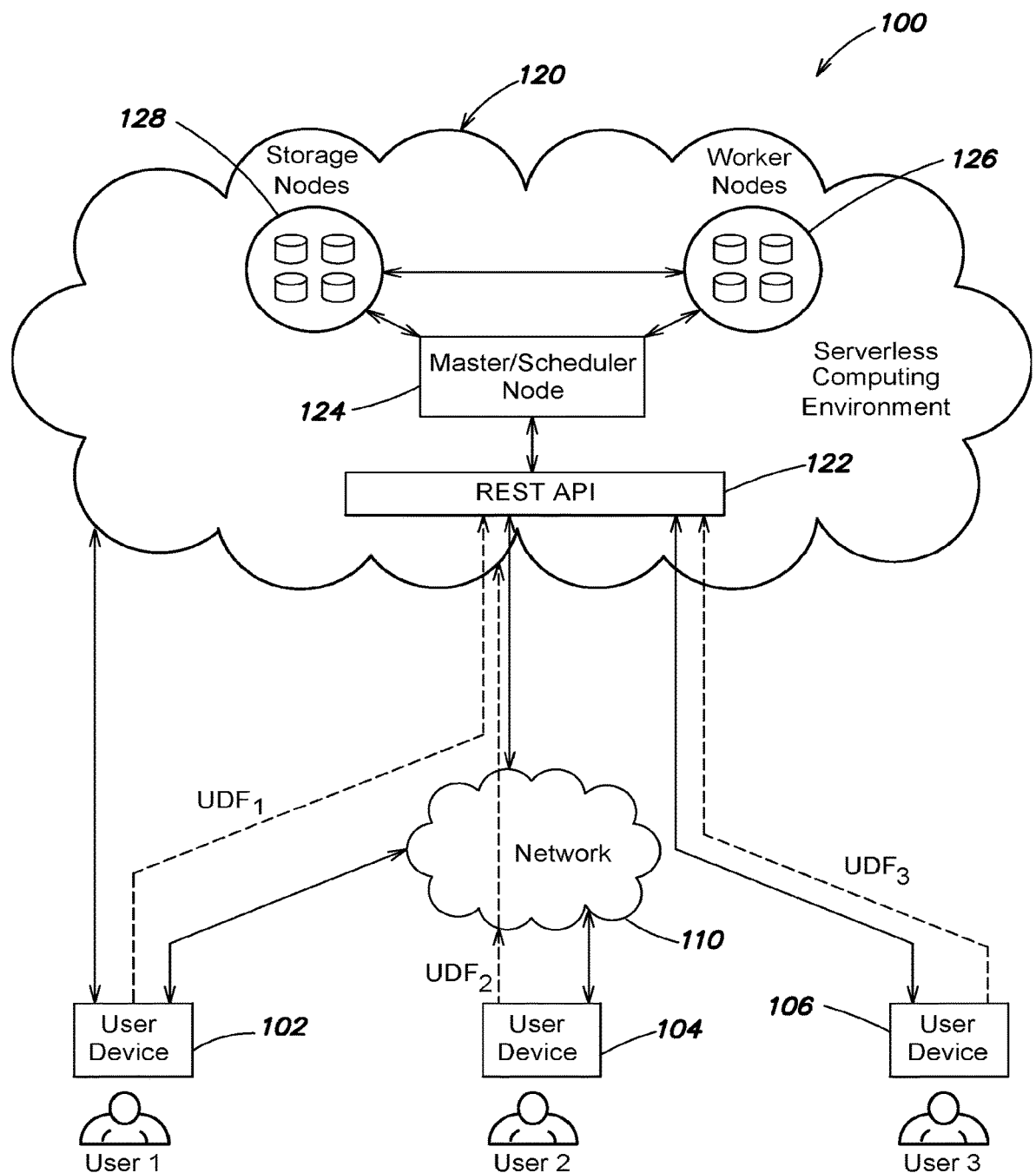
FIG. 1 depicts an example environment in which aspects of the present disclosure may operate.

FIG. 1 illustrates an example network environment 100 in which the present disclosure may operate. Environment 100 includes a number of user devices, illustrated here as user devices 102, 104, and 106, although it is understood that various numbers of user devices may be provided. The user devices are variously coupled to one or more of a network 110 and a serverless computing environment 120. Each user device is capable of providing access to one or more users, illustrated here as User 1, User 2, and User 3. The user devices can be provided by one or more of mobile phones, tablets, laptop computers, desktop computers, workstations, and various other computing devices, both mobile and stationary, as would be appreciated by one of ordinary skill in the art. In general, it is contemplated that user devices include input means to permit a user of the device to input or otherwise define one or more User Defined Functions (UDFs) to be executed (i.e. calculated) by serverless computing environment 120. In some embodiments, the user devices 102, 104, 106 may store one or more UDFs in memory such that a user such as User 1, User 2, or User 3 is able to simply select a pre-defined UDF for transmission and execution on serverless computing environment 120, or is able to select a pre-defined UDF for editing prior to transmission and execution on serverless computing environment 120.

As mentioned previously, each of the user devices is coupled to one (or both) of network 110 and serverless computing environment 120. For example, user device 104 is coupled only to network 110, which acts as a relay for communications between user device 104 and serverless computing environment 120. On the other hand, user device 106 is coupled only to serverless computing environment 120, meaning that it is communicatively isolated from other user devices and any other devices connected to network 110. Such a direct coupling to serverless computing environment 120 might provide greater security at the cost of greater inconvenience for more general purpose operations and communications. A third configuration is exemplified by user device 102, which has direct communicative links to both network 110 and serverless computing environment 120. As such, user device 102 and user device 104 are communicatively coupled via network 110, which can be beneficial if both User 1 and User 2 are working on a common project or otherwise cooperating, while user device 102 still maintains a direct communicative link to serverless computing environment 120 in cases in which greater security might be desired.

The aforementioned communicative links may be wired or wireless, employing various communication technologies and standards known in the art, without departing from the scope of the present disclosure. In some embodiments, serverless computing environment 120 might be publically accessible via the Internet, and its constituent hardware components arranged in either a distributed or centralized fashion. In some embodiments, one or more constituent hardware components of serverless computing environment 120 may be co-located with one or more user devices. Such a case might arise when serverless computing environment 120 may not be publically accessible and is instead provided in an access restricted manner (although it is noted that the aforementioned co-location is not a requirement for implementing access restriction). For example, an access restricted serverless computing environment 120 might be implemented such that only co-located computing devices or users that are employees of an approved business entity may access the serverless computing environment 120.

As illustrated, the architectural overview of serverless computing environment 120 presented in FIG. 1 is seen to comprise a REST API 122 (Representational State Transfer Application Programming Interface), utilized in order to implement an interface layer between serverless computing environment 120 and external networks and computing devices that wish to access or otherwise utilize the computational resources of serverless computing environment 120. As illustrated, these computational resources are provided by a master node 124 (alternatively referred to herein as a scheduler node or an executor node), a plurality of worker nodes 126, and a plurality of storage nodes 128, although it is again understood that various other components can be utilized to implement the serverless computing environment computational resources without departing from the scope of the present disclosure.

Broadly, the plurality of storage nodes 128 are used to store raw or processed data, and can provided as computing elements (e.g. having significant computational capability beyond that required to manage storage functionalities) or as storage elements (e.g. having minor computational capability beyond that required to manage storage functionalities). The plurality of worker nodes 126 retrieve data (either raw or previously processed) from the plurality of storage nodes 128 and then process the retrieved data in accordance with one or more UDFs that are executing on the worker nodes. A given worker node is typically provided with some amount of local storage, although this storage is often primarily consumed by storage of the data currently being processed by the worker node and/or storage of final results and intermediate results of processing and executing a UDF. In some embodiments, the functionality of the worker nodes 126 and the storage nodes 128 might be combined, such that only a single type of node is provided in serverless computing environment 120. The plurality of worker nodes 126 might be homogenous or may vary in their hardware components and computational capabilities. Similarly, the plurality of storage nodes 128 might be homogenous or may vary in their hardware components and computational capabilities. Finally, as would be appreciated by one of ordinary skill in the art, the worker nodes 126 and storage nodes 128 can be arranged in any fashion—distributed, centralized, or otherwise—as is known to be compatible with the implementation of a serverless computing environment such as serverless computing environment 120.

Master node 124 is communicatively coupled between the REST API 122 and both the plurality of worker nodes 126 and the plurality of storage nodes 128, and acts to allocate incoming UDFs to the appropriate subsets of worker nodes and storage nodes. For example, master node 124 might analyze a given UDF to determine the computational capability that is either required or requested, and might then analyze a current state of the plurality of worker nodes 126 to determine which, if any, subsets of worker nodes are eligible to execute the UDF. In order to analyze the current state of the worker nodes, the worker nodes generate and transmit tickets or update packets to the master node 124. These tickets can include, but are not limited to, information such as a current status/health of the node, a current utilization of the node, a current storage availability of the node, etc. Tickets might be generated in response to any state change of a given worker node or any change in one of the parameters encoded within the ticket. Tickets may also be generated in response to the expiration of some pre-defined refresh period, e.g. if a worker node has not generated a ticket in the last five minutes then it will be triggered to generate a new ticket, even if there has been no state change.

As such, master node 124 can broadly be viewed as a central executor and central information hub in serverless computing environment 120, operable to monitor the state of the worker nodes and storage nodes and further operable to analyze and assign UDFs to a task queue where they await execution. From the task queue, master node 124 will assign a given UDF to one or more worker nodes for execution. In embodiments with distinct storage nodes and worker nodes, it will not be the case that the data required to execute the UDF resides on the same node where it is to be processed. Even in embodiments with at least some combined worker/storage nodes, it will still be highly unlikely that the data required to execute the UDF is stored on the same node where it is to be processed, particularly in serverless computing environments with a very large number of nodes, very large or distributed data sets, or both.

As such, upon receipt of the newly assigned UDF, a worker node must almost always then locate and retrieve the required data before beginning to execute the UDF. While this process is ongoing, the worker node sits inactive, the UDF unprocessed. Depending on various network characteristics within the serverless computing environment (e.g. bottlenecks, bandwidth issues, broken links, broken nods, etc.) this latency can be even greater than what would otherwise be expected for only locating and retrieving the data. As such, the processing of UDFs in serverless computing environments is found to suffer from higher than usual execution latency of UDFs due to the fact that provisioning of the execution environment (e.g. spinning up certain docker containers) does not begin until after each request or UDF execution task is received at the worker node. As such, while master node 124 can be utilized to optimize between various goals such as minimizing average wait time of UDFs in the task queue, minimizing the longest wait time of a UDF in the task queue, maximizing utilization of the worker nodes, etc., such optimization is inherently limited by the inability to account for data retrieval induced latency.

Figure 2:
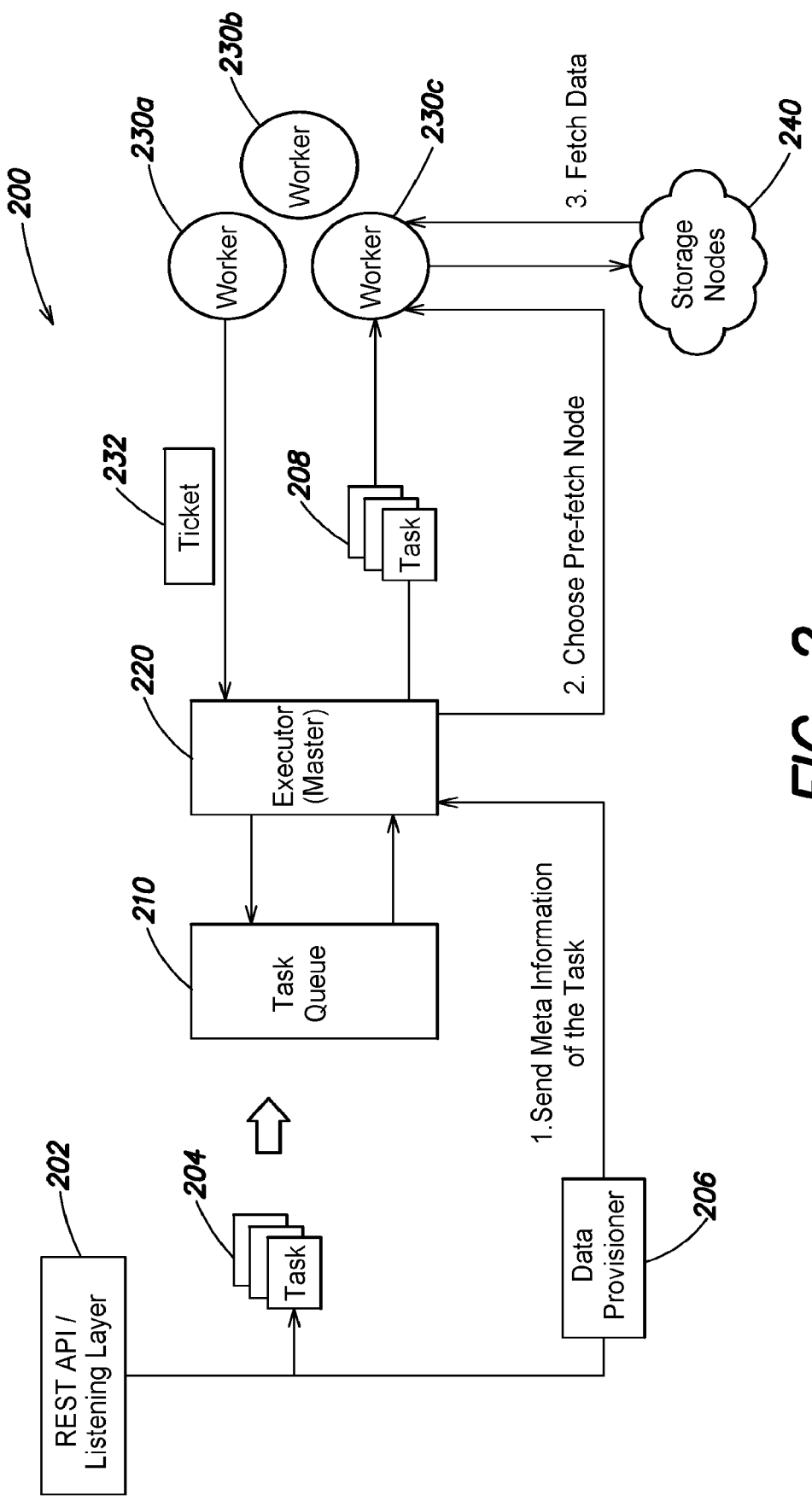
FIG. 2 depicts an example architecture of a serverless computing environment implementing aspects of the present disclosure.

FIG. 2 illustrates an example architecture 200 of a serverless computing environment implementing the data provisioning solution of the present disclosure. A REST API 202 (or other listener layer) receives or retrieves various User Defined Functions (UDFs), represented here as tasks 204, ('task' and 'UDF' are used interchangeably herein). As noted previously, these UDFs or tasks can be generated by users of one or more user computing devices, and either actively pushed to REST API 202 or passively pulled by REST API 202.

From REST API 202, the tasks 204 are entered into a task queue 210, where they generally are stored based on the order in which they are received (e.g. a First In First Out, FIFO, queue), although it is appreciated that other manners of queues may be implemented by task queue 210. Task queue 210 is communicatively coupled with master node 220, which receives a plurality of tickets 232 from a corresponding plurality of worker nodes 230 (represented here as individual nodes 230a, 230b, 230c). The tickets and nodes described herein can be taken as providing and inheriting the same characteristics attributed to the tickets and nodes previously described with respect to FIG. 1.

Whereas a conventional serverless computing environment would simply retrieve tasks from task queue 210 and assign them to worker nodes 230, at which point in time the given worker nodes would retrieve the requisite data from one or more of a plurality of storage nodes 240 and only then begin executing the task, the illustrated architecture 200 provides an additional component—data provisioner module 206—to avoid this latency associated with conventional serverless computing environments.

Data provisioner module 206 can be communicatively coupled between REST API 202 and task queue 210, as illustrated here, although alternate placements are possible if desired. Via this coupling, data provisioner module 206 also receives a copy (or is able to inspect a copy) of each task 204 that is being entered into the task queue 210. In some embodiments, data provisioner module 206 might be equipped to store an internal log of each task that it has inspected or received, such that this internal log can be compared with the tasks contained within task queue 210, thereby ensuring that a consistent state is maintained between data provisioner module 206 and task queue 210.

From the copies of each received task, data provisioner module 206 inspects the task and analyzes it to extract information corresponding to the data that will be needed for a worker node to execute the task. In some instances, this information might be extracted from metadata associated with the task or UDF. In some embodiments, this information might be extracted after data provisioner module 206 parses and analyzes the task or UDF itself. As discussed previously, UDFs are typically only provisioned to a worker node, which is responsible for performing all necessary data retrieval itself—typically as an early step in the process of executing the UDF. As such, in some embodiments data provisioner module 206 can analyze each UDF to retrieve this requisite information from the function calls that each UDF would otherwise make.

In general, this information specifies one or more locations of this data and a portion of the data to be retrieved from each location. For example, a location identifier might be provided in the form of a Uniform Resource Identifier (URI). A URI might point to a location that is internal to the serverless computing environment (i.e. at a storage node of the plurality of storage nodes 240 or at a worker node of the plurality of worker nodes 230) or might point to a location that is external to the serverless computing environment (i.e. at some node, server, computing device, database, etc. that is provided by a third party or otherwise not associated with the functionality of the serverless computing environment). Additionally, based on various storage schemes (and their associated data duplication policies) there may be instances in which the data needed for a given task to execute is stored in multiple locations. In such instances, a location identifier might be provided for one or more of the eligible locations, internal or external.

Such locations might be repositories of data to be processed by the UDF or libraries required for the UDF to execute, both of which may be instances in which the entire content specified by the URI can be downloaded. However, it may often be the case that the URI contains more fragmented or varied data, of which only a portion is required by the UDF. As such, a more universal implementation can include, in addition to the data location/URI, one or more data portion identifiers for each URI. For example, each data portion needed from a given URI could be specified by start byte and end byte, start byte and total number of bytes, total number of bytes and end byte, or other such means of identifying portions of data in a file system or at the given URI.

Thus, with this characterizing information for each received task 204 determined as either one or more (data location, data portion) or (data location) pairs, data provisioner module 206 can transmit this characterizing information to the master node 220. In some embodiments, data provisioner module 206 may prevent the transmission of a task into task queue 210 until characterizing information for the task has been determined. In this manner, situations in which a task enters the task queue and is selected for allocation by master node 220 before data provisioner module 206 has transmitted characterizing information of the task to master node 220 can be avoided. For example, data provisioner module 206 may itself receive tasks 204 from REST API 202 and then transmit the tasks 204 to task queue 210 and the corresponding characterizing information for tasks 204 to master node 220 at substantially the same time; REST API 202 may receive tasks 204 and forward them only to data provisioner module 206, which will then transmit a 'release' command to REST API 202 at substantially the same time that the characterizing information is transmitted to master node 220; or master node 220 can check to see if it has received corresponding characterizing information for a task before it allocates that task.

Regardless the implementation, it is generally contemplated that master node 220 receives characterizing information of a task before allocating one or more worker nodes to execute the task. From this characterizing information, master node 220 is newly operable to perform a first step of data provisioning and a second step of task provisioning (i.e. allocation), as opposed to conventional systems which only perform a single step of task provisioning.

In the data provisioning step, one or more worker nodes are assigned to pre-fetch the data that will be required to execute the task or UDF. In this manner, it is contemplated that one or more worker nodes will already have stored copies of the requisite data before the given task is ever assigned by the master node 220. Optimally, this data provisioning could be performed in a just-in-time (JIT) manner, wherein master node 220 selects the worker nodes for data provisioning and then assigns the task for execution just as the worker nodes complete their pre-fetch of the requisite data. In some embodiments, only idle nodes may be assigned to pre-fetch data. In some embodiments, active nodes with some amount of idle capacity can be assigned to pre-fetch data using their idle capacity. That is, a worker node might be currently executing one or more tasks using a first percentage of its computational capacity and can use some second percentage of its computational capacity to retrieve the pre-fetch data in parallel with the ongoing computations.

Because the characterizing information indicates the data and the data location that will need to be accessed by a worker node before executing an assigned task or UDF, master node 220 can perform several degrees of analysis in selecting worker nodes amongst the plurality of worker nodes 230 to pre-fetch this data. For example, to perform data provisioning for a given task, master node 220 can analyze any of the following criteria: whether a worker node is currently available, whether a worker node will soon be available (e.g. projected to be available by the time the given task reaches the top of task queue 210), whether a worker node has the computational capabilities required by the given task, whether a worker node currently has at least a portion of the data needed for the given task, the proximity (e.g. transmission latency or number of hops) of a worker node to the nearest location of the task data, whether the task can be processed in parallel on multiple worker nodes, and whether other future tasks will require the same data as the given task.

A simplistic approach might be to simply check whether a worker node is available and also eligible (computationally capable) to process the task, and then select from amongst this pool one or more worker nodes that will be assigned to pre-fetch the data required to process the task or UDF. A moderately advanced approach can build off of the simplistic approach and add the additional checks of whether the worker node currently has stored any of the data needed to execute the task. A more advanced approach still can build off of the moderately advanced approach and have master node 220 further calculate the proximity between the eligible worker nodes and the various sources of the data needed to execute the task.

In order to reduce the complexity of such a proximity calculation, master node 220 can build a network graph or spanning tree representing the interconnections between the various worker nodes, storage nodes, and other data sources or URIs, such that the proximity calculation need not be performed from scratch but instead can comprise a lookup. Alternatively, after performing a proximity calculation, master node 220 can use the newly calculated proximity information to build and store a similar network graph in memory, an approach which would reduce upfront computational costs.

Independent of the approach used, a master node 220 must also make a determination of how many worker nodes should be selected to pre-fetch data for the data provisioning of the given task. In some embodiments, the minimum number of nodes needed to execute the given task might be provisioned. However, this carries the risk of provisioned worker nodes no longer being available by the time that a task is actually assigned for execution by master node 220. For example, the worker node may have reduced computational capacity due to a hardware failure or an increased computational load from its currently executing task. If any of these situations occur, then additional worker nodes must be provisioned while the task waits to resume—the same latency issue normally experienced in conventional serverless computing environments. As such, it can be desirable to provide some number of provisioned worker nodes in excess of the number required by the task or UDF, which effectively function as a buffer or hedge against any data provisioned nodes becoming ineligible by the time of task allocation.

Some tasks or UDFs might be compatible with parallel execution on multiple worker nodes, with such a determination of parallel eligibility being provided by a user during creation of the UDF, determined by data provisioner module 206, or determined by mater node 220. With a determination of parallel eligibility being made, master node 220 may perform an additional balancing step in determining how many worker nodes to be allocated for the parallel task. Generally, the more nodes assigned to a parallel task, the faster the task may be completed. However, in the context of the present disclosure, an inflection point exists wherein a parallel task can be processed in a shorter amount of time than is required for the participating nodes to complete their data provisioning pre-fetch for an upcoming task. As such, in addition to any general computational availability limits present when allocating worker nodes for parallel processing tasks, an upper limit of the number of nodes to allocate can be given such that the involved nodes will all complete their data provisioning pre-fetch prior to completing their portion of the parallel processing task.

An additional consideration for parallel processing tasks is given by the distribution of pre-fetch data to the worker nodes. A simple approach might simply provision the selected worker nodes with the entirety of the data set needed for the execution of the complete task. However, particularly in highly parallel tasks spread across numerous worker nodes, much of this data pre-fetch is unnecessary, as each worker node in the parallel task will often only require a portion of the overall task data set. As such, in some embodiments, master node 220 may pre-provision a parallel task to multiple worker nodes such that each worker node will only pre-fetch the portion of task data needed for its portion of the overall task execution. A logic similar to that described previously with respect to a buffer of backup provisioned nodes can also be provided. In some embodiments, each provisioned worker node might pre-fetch data sufficient to perform numerous roles in the parallel processing—in that manner, master node 220 can examine the current state of the worker nodes (based on the received tickets 232) at the instant that the parallel task is to be assigned, and then based on this current state information and the knowledge of which worker nodes are capable of taking on which roles, can then perform the final parallel task allocation across the provisioned worker nodes in the most efficient manner.

In some instances, a parallel processing eligible task may be split into a number of parallel tasks that are then not all executed in parallel. For example, a parallel task might be split into 100 parallel sub-tasks, but then processed on only 50 worker nodes. In this manner, master node 220 can perform data provisioning to leverage the knowledge that each of the 50 worker nodes will continue to be provisioned with the requisite pre-fetch data after the first 50 sub-tasks complete. For example, master node might analyze the plurality of tickets 232 to assess the state of the plurality of worker nodes 230 as currently congested, but likely to be highly available in the near future upon the completion of a large, currently executing task. Accordingly, master node 220 might provision available worker nodes with pre-fetch data corresponding to the smaller sub-tasks of the parallel task, and provision the soon to be available worker nodes with pre-fetch data corresponding to the larger sub-tasks of the parallel task.

In other embodiments, tasks or UDFs in task queue 210 may not be compatible with parallel processing, but can nevertheless have parallel data requirements. That is, a Task A, Task B, and Task C might all require the same data for their execution. Such a scenario might be given when different UDFs are utilized to test or implement different theories, hypotheses, algorithms, etc. against the same dataset for purposes of comparing the UDFs. As was the case with tasks that can be parallel processed, task with parallel data requirements can be handled as special cases by master node 220. Likewise, the determination of parallel data requirements can be input by a user when generating the UDFs, can be determined by data provisioner module 206, can be determined by master node 220, or any combination of the three. For example, data provisioner module 206 can scan the characterizing information generated for each task 204 to identify any similar or overlapping (either wholly or partially) data requirements and update or flag the characterizing information to reflect this fact. In practice, after provisioning one or more worker nodes to pre-fetch data for Task A, master node 220 may then assign the same worker nodes to next execute Task B and/or Task C after the completion of Task A. While such task allocation does not adhere to the traditional first in first out system generally employed by queues, overall efficiency gains can be realized by minimizing the number of pre-fetches performed by the various worker nodes.

Such a statement generally holds true for any of the specific scenarios described above—while the use of pre-fetches reduces latency as compared to conventional approaches with no pre-fetches, repeated or other unnecessary pre-fetches can add latency and reduce the benefit otherwise provided by the present disclosure. As such, an additional factor upon which master node 220 can perform data allocation and task allocation would be minimizing the number of times a given worker node refreshes its pre-fetch data store. In parallel task processing, after completing a sub-task a worker node can be allocated another sub-task of the same overall parallel task. In parallel data requirement task processing, after completing a first task a worker node can be allocated a second task from the same parallel data requirement group.

Figure 3:
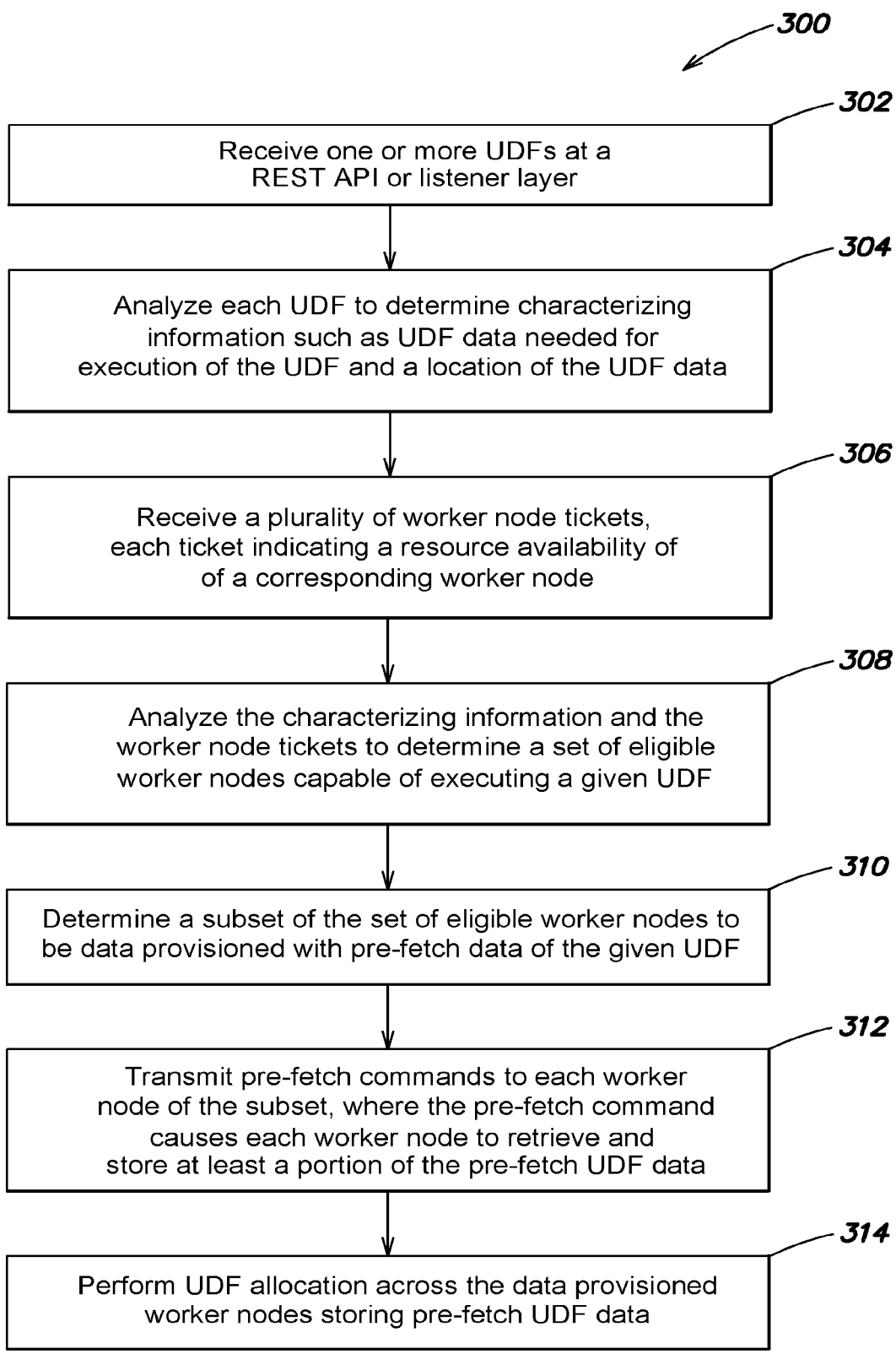
FIG. 3 depicts a flowchart of a method of the present disclosure.

FIG. 3 depicts a flowchart 300 of an example method of the present disclosure. In a first step 302, one or more UDFs are received at a REST API or a listener layer. For example, the one or more UDFs can be received directly from one or more user devices, or can be received indirectly from storage, over a network, or other means.

After the one or more UDFs are received, each UDF is analyzed in a step 304. In particular, each UDF is analyzed for characterizing information regarding the execution or provisioning required in order to enable the execution of the UDF. For example, this characterizing information can include a location of data needed by the UDF and can further include an identification of a specific portion or portions of the data needed from the location. This characterizing information can be parsed from the UDF, for example by analyzing function calls that otherwise would be executed by a worker node upon initializing the execution of the UDF, or can be derived via other analytical means.

In a step 306, which can be performed subsequent to steps 302 and 304, a master node or scheduler receives a plurality of worker node tickets from one or more worker nodes of the system. These worker node tickets indicate the resource availability of a corresponding worker node, i.e. the worker node that generated the worker node ticket. From these worker node tickets, the master node or scheduler is operative to perform a substantially real-time characterization of a state of each worker node, and therefore, the overall pool of worker nodes. Accordingly, in order to maintain up-to-date information, step 306 may be performed continuously, i.e. may be performed concurrent with one or more of the remaining steps seen in flowchart 300, rather than only performed between steps 304 and 308 as is illustrated. Worker node tickets might be generated at a regular interval (e.g. every minute) or generated in response to a change (e.g. a state change) detected at the worker node or both. Worker node tickets can be generated in a push fashion (transmitted freely by the worker nodes to the master node or scheduler) or in a pull fashion (generated by the worker nodes in response to a command from the master node or scheduler).

In a step 308, the characterizing information is analyzed along with the worker node tickets in order to determine a set of eligible worker nodes that are capable of executing a given UDF corresponding to the characterizing information. In some embodiments, this analysis can be performed by a data provisioner module of the serverless computing environment, by a master node or scheduler of the serverless computing environment, or some combination of the two. For example, a data provisioner module could be provided as a module in the same serverless computing environment on which the UDFs execute, such that the data provisioner module comprises hardware elements, software elements, or some combination of the two. For example, the data provisioner module could be provided in the serverless computing environment in a manner similar to which the master node or scheduler is provided. In some embodiments, the data provisioner module can be flexibly reassigned amongst the various hardware elements that comprise the overall serverless computing environment. In some embodiments, the data provisioner can be provided by a static collection of hardware elements that may be selected from the hardware elements of the serverless computing environment or may be separately provided in addition to the hardware elements of the serverless computing environment. No matter where the analysis is performed, it is generally contemplated that the analysis examines the computing requirements indicated by the characterizing information of the UDF or a separate analysis of the UDF, and then analyzes these computing requirements against a computing capability of each worker node as derived from one or more worker node tickets received from the worker node. Thus, the step is operable to determine a set of worker nodes that have both the raw computational ability and the available computational capacity to execute the UDF being analyzed.

In a next step 310, a subset is selected from the set of all worker nodes that are eligible to execute the given UDF. In particular, the subset is selected to only contain those eligible worker nodes that are best suited to be data provisioned with pre-fetch data of the UDF. This pre-fetch data corresponds to the data needed to execute the UDF, as indicated by the characterizing information obtained in step 304. In some embodiments, a minimum, maximum, or both, can be set such that the number of data provisioned nodes is in accordance with the desired parameters. The nodes to be provisioned with pre-fetch data can be selected on criteria such as their distance to a source of the pre-fetch data (e.g. latency, number of hops, etc.), an available storage capacity, an estimated time to completion of any current processing tasks, or other factors as desired.

Next, in a step 312, with the subset selected, pre-fetch commands are generated (for example by one or more of the master node/scheduler and the data provisioner) and transmitted to each worker node of the selected subset. These pre-fetch commands can cause a worker node receiving the pre-fetch command to retrieve the pre-fetch data, or an indicated portion of the pre-fetch data as specified by the pre-fetch command, and then store at least a portion of the retrieved pre-fetch data. For example, the worker node might retrieve the pre-fetch data from a storage node that is also a part of the same serverless computing environment. In this case, the pre-fetch command might contain a URI for the storage node and an indicator of the portion of data to retrieve from that URI. In some instances, the worker node might retrieve the pre-fetch data from a storage node or other data repository that is not a part of the serverless computing environment, i.e. from an external data source. In this case, the pre-fetch command could contain a URI, a URL, a network address, or other necessary information to facilitate a communicative coupling between the worker node and the external data source. With the data retrieved in accordance with the pre-fetch command, the worker node stores the pre-fetch data but does not begin executing the UDF or a portion of the UDF associated with the pre-fetch data. At this point, these worker nodes are referred to as data provisioned nodes, because they contain pre-fetch data for the given UDF.

In a next step 314, the master node or scheduler can then perform UDF allocation in order to cause the UDF to be executed by the serverless computing environment. The UDF allocation might take place over only the data provisioned nodes for that UDF, or could also include additional worker nodes that are not data provisioned. UDF allocation can be performed or optimized over various parameters such as completion time, degree of parallel computation desired, power consumption, etc. With one or more worker nodes selected, the master node or scheduler can then cause the selected one or more worker nodes to begin executing the UDF. In cases where a data provisioned worker node is selected, the UDF can begin executing immediately as all necessary data is already stored on the worker node. In cases where a non-data provisioned worker node is selected, the UDF pauses and does not begin execution until the worker node has finished locating and retrieving the necessary data.

Figure 4A:
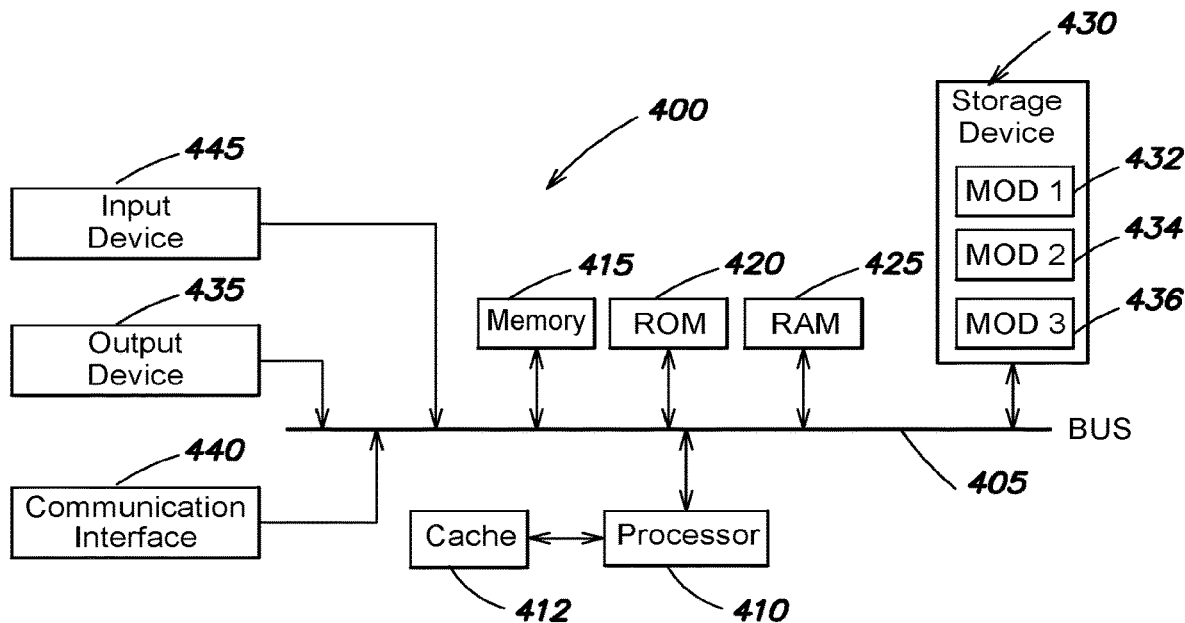
FIGS. 4A and 4B illustrate schematic diagrams of example computing systems for use with example system embodiments.
Figure 4B:
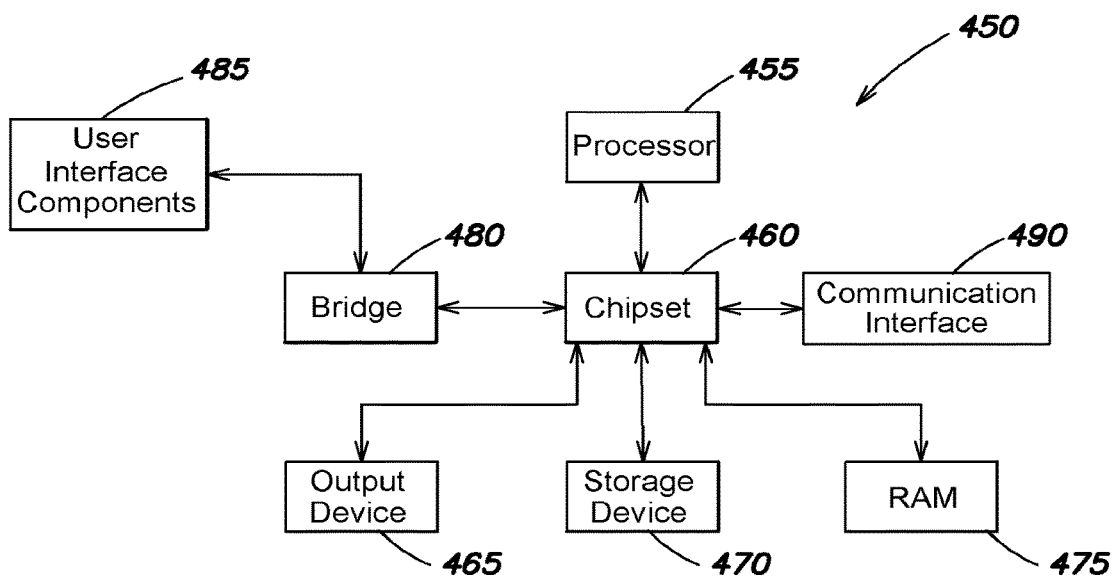

FIG. 4A and FIG. 4B illustrate example computing systems for use as a control device in the example system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates an example computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output device 465, such as a display, and can read and write information to storage device 470, which can include magnetic media, and solid state media, for example. Chipset 460 can also read data from and write data to RAM 475. A bridge 460 for interfacing with a variety of user interface components 465 can be provided for interfacing with chipset 460. Such user interface components 465 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 465 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

We claim:

1. A method comprising:
   receiving, at a listening layer, and analyzing a user defined function (UDF) for information relating to data needed for execution of the UDF, wherein the UDF is generated by a user of a user device, the information including at least a location of the data to be prefetched and the UDF requires at least a portion of the data be on a node where the UDF is to be executed before the UDF can begin to execute;
   determining, at a serverless computing environment, plurality of work nodes eligible to execute the UDF based at least in part on the location of the data;
   selecting, at the serverless computing environment, a subset of worker nodes of the plurality of work nodes;
   generating and transmitting, at the serverless computing environment, one or more instructions to at least one of the subset of eligible worker nodes to pre-fetch the data needed for execution of the UDF, wherein the one or more instructions cause the subset of eligible worker nodes to pre-fetch the data needed for execution of the UDF and store the pre-fetched data; and
assigning the UDF to the at least one of the subset of eligible worker nodes to execute the one or more instructions.

2. The method of claim 1,
wherein,
the subset of eligible worker nodes are in an idle state,
the subset of eligible worker nodes each store the pre-fetched data; and
the assigning of the UDF includes selecting at least one of the subset of eligible worker nodes to execute the UDF.

3. The method of claim 1, wherein the subset of eligible worker nodes are selected based on at least one of a distance to a location of the data, an available capacity, or an estimated time to complete current tasks.

4. The method of claim 1, wherein the assigning of the UDF includes additional worker nodes of the plurality of worker nodes that have not stored the pre-fetched data.

5. The method of claim 1, further comprising:
determining whether the UDF is eligible for parallel execution;
in response to determining the UDF is eligible for parallel execution, generating a plurality of instructions to the subset of eligible worker nodes, each instruction of the plurality of instructions to pre-fetch a portion of the data associated with the UDF;
transmitting the plurality of instructions to the subset of eligible work nodes, wherein each instruction of the plurality of instructions is not transmitted to more than one node of the subset of eligible worker nodes; and
assigning the UDF to the subset of eligible worker nodes.

6. The method of claim 1, wherein the assigning the UDF to the subset of eligible worker nodes is based on one or more parameters including completion time, degree of parallel computation desired, or power consumption.

7. The method of claim 1, wherein the one or more instructions includes at least a location of the pre-fetched data.

8. A system comprising:
at least one processor; and
at least one memory storing instructions, which when executed by the at least one processor, causes the at least one processor to:
receive, at a listening layer, and analyze a user defined function (UDF) for information relating to data needed for execution of the UDF, wherein the UDF is generated by a user of a user device, the information including at least a location of the data to be prefetched and the UDF requires at least a portion of the data be on a node where the UDF is to be executed before the UDF can begin to execute;
determine a plurality of work nodes eligible to execute UDF based at least in part on the location of the data;
select a subset of worker nodes of the plurality of work nodes;
generate and transmit one or more instructions to at least one of the subset of eligible worker nodes to pre-fetch the data needed for execution of the UDF, wherein the one or more instructions cause the subset of eligible worker nodes to pre-fetch the data needed for execution of the UDF and store the pre-fetched data; and
assign the UDF to the at least one of the subset of eligible worker nodes to execute the one or more instructions.

9. The system of claim 8,
wherein,
the subset of eligible worker nodes are in an idle state,
the subset of eligible worker nodes each store the data; and
the assignment the UDF includes a selection of at least one of the subset of eligible worker nodes to execute the UDF.

10. The system of claim 8, wherein the subset of eligible worker nodes are selected based on at least one of a distance to a location of the data, an available capacity, or an estimated time to complete current tasks.

11. The system of claim 8, wherein the assignment of the UDF includes additional worker nodes of the plurality of worker nodes that have not stored the pre-fetched data.

12. The system of claim 8, further comprising instructions, which when executed by the at least one processor causes the at least one processor to:
determine whether the UDF is eligible for parallel execution;
in response to determination that the UDF is eligible for parallel execution, generate a plurality of instructions to the subset of eligible worker nodes, each instruction of the plurality of instructions to pre-fetch a portion of the data associated with the UDF;
transmit the plurality of instructions to the subset of eligible work nodes, wherein each instruction of the plurality of instructions is not transmitted to more than one node of the subset of eligible worker nodes; and
assign the UDF the subset of eligible worker nodes.

13. The system of claim 8, wherein the assignment of the UDF to the subset of eligible worker nodes is based on one or more parameters including completion time, degree of parallel computation desired, or power consumption.

14. The system of claim 8, wherein the one or more instructions includes at least a location of the pre-fetched data.

15. At least one non-transitory computer readable medium storing instructions, which when executed by the at least one processor of a serverless computing environment, causes the at least one processor to:
receive, at a listening layer, and analyze a user defined function (UDF) for information relating to data needed for execution of the UDF, wherein the UDF is generated by a user of a user device, the information including at least a location of the data to be prefetched and the UDF requires at least a portion of the data be on a node where the UDF is to be executed before the UDF can begin to execute;
determine a subset of worker nodes of a plurality of work nodes eligible to execute a user defined function (UDF) based at least in part on the location of the data;
select a subset of worker nodes of the plurality of work nodes;
generate and transmit, at the serverless computing environment, one or more instructions to at least one of the subset of eligible worker nodes to pre-fetch the data needed for execution of the UDF, wherein the one or more instructions cause the subset of eligible worker nodes to pre-fetch the data needed for execution of the UDF and store the pre-fetched data; and
assign the UDF to the at least one of the subset of eligible worker nodes to execute the one or more instructions.

16. The at least one non-transitory computer readable medium of claim 15,
wherein,
the subset of eligible worker nodes are in an idle state,
the subset of eligible worker nodes each store the data; and
the assignment of the UDF includes a selection of at least one of the subset of eligible worker nodes to execute the UDF.

17. The at least one non-transitory computer readable medium of claim 15, wherein the subset of eligible worker nodes are selected based on at least one of a distance to a location of the data, an available capacity, or an estimated time to complete current tasks.

18. The at least one non-transitory computer readable medium of claim 15, wherein the assignment of the UDF includes additional worker nodes of the plurality of worker nodes that have not stored the pre-fetch data.

19. The at least one non-transitory computer readable medium of claim 15, further comprising instructions, which when executed by the at least one processor causes the at least one processor to:
determine whether the UDF is eligible for parallel execution;
in response to determination that the UDF is eligible for parallel execution, generate a plurality of instructions to the subset of eligible worker nodes, each instruction of the plurality of instructions to pre-fetch a portion of the data associated with the UDF;
transmit the plurality of instructions to the subset of eligible work nodes, wherein each instruction of the plurality of instructions is not transmitted to more than one node of the subset of eligible worker nodes; and
assign the UDF to the subset of eligible worker nodes.

20. The at least one non-transitory computer readable medium of claim 15, wherein the assignment of the UDF to the subset of eligible worker nodes is based on one or more parameters including completion time, degree of parallel computation desired, or power consumption.

\* \* \* \* \*